(No Model.)
J. L. HALL.
NUT LOCK.
No. 363,820. Patented May 31, 1887.
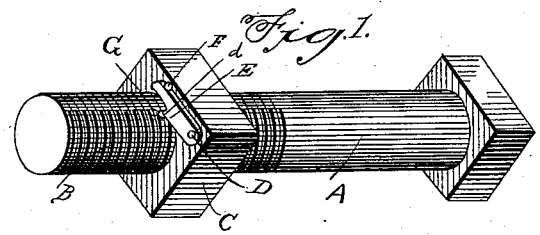
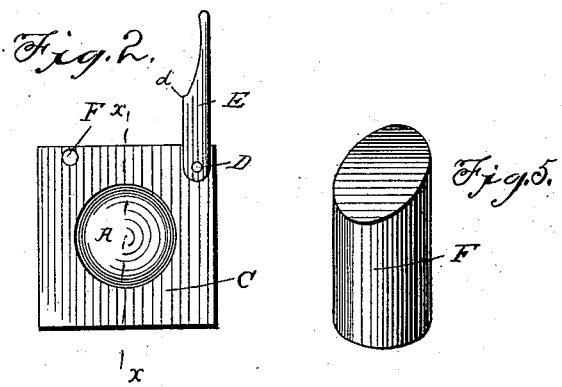
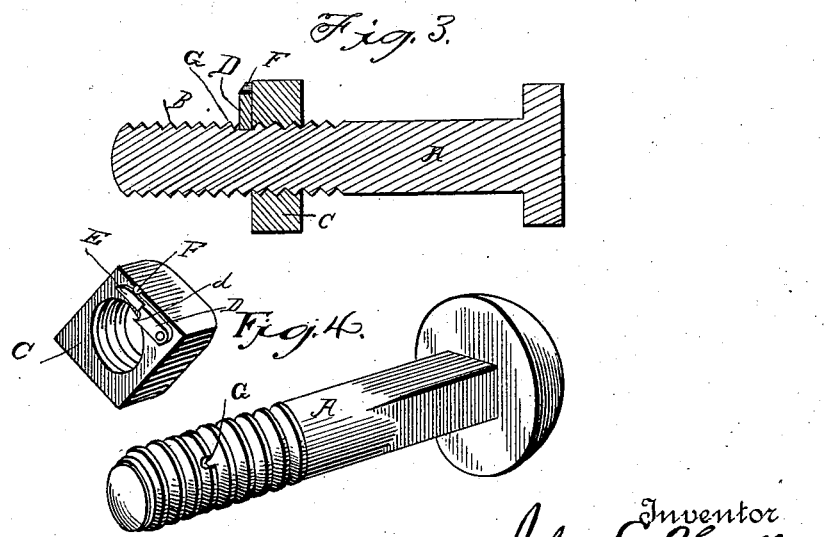
Witnesses
Henry G. Dieterich
J. W. Garner
Inventor
John L. Hall
By his Attorneys
C. A. Snow & Co.

UNITED STATES PATENT OFFICE.

JOHN LAWRENCE HALL, OF VAN WERT, OHIO.

NUT-LOCK.

SPECIFICATION forming part of Letters Patent No. 363,820, dated May 31, 1887.

Application filed February 15, 1887. Serial No. 227,704. (No model.)

*To all whom it may concern:*

Be it known that I, JOHN LAWRENCE HALL, a citizen of the United States, residing at Van Wert, in the county of Van Wert and State of Ohio, have invented a new and useful Improvement in Nut-Locks, of which the following is a specification.

My invention relates to an improvement in nut-locks; and it consists in the peculiar construction and combination of devices, that will be more fully set forth hereinafter, and particularly pointed out in the claim.

In the drawings, Figure 1 is a perspective view of a nut-lock embodying my improvement. Fig. 2 is a front elevation of the same. Fig. 3 is a longitudinal section taken on the line $x\ x$ of Fig. 2. Fig. 4 is a perspective view of the parts detached. Fig. 5 is a detail view of the beveled stop for the pawl.

A represents a bolt of the usual construction, and having its shank provided at a suitable distance from its outer end with screw-threads B.

C represents a nut, which is provided with a threaded opening adapted to engage the threaded shank of the bolt. To the front side of the nut, at one corner thereof, is pivoted a pawl, D, having an engaging-point, $d$, and which is provided at its free end with an extended spring-arm, E. From the front side of the nut a stud, F, also projects, the said stud having its face beveled on one side, and being located at such a point as to cause it to engage the spring-arm of the pawl when the latter is turned to engage the bolt.

The operation of my invention is as follows: After the nut is screwed home upon the bolt, a longitudinal recess or kerf, G, is made in the shank of the bolt by means of a cold-chisel. The pawl is then turned on its pivot and caused to engage the notch or kerf in the bolt, so as to prevent the nut from turning and working loose on the bolt. When the pawl is turned toward the shank of the bolt, the extended spring-arm of the pawl passes over the inclined face of the stud or stop, and when the pawl is turned so far upon its pivot as to have the point $d$ in engagement with the notch or recess in the bolt the spring-arm has passed entirely beyond the stud, and consequently engages the inner side of the same, thus holding the pawl securely locked in engagement with the bolt, and preventing the nut from working loose on the bolt.

In order to release the nut from the bolt, a pointed instrument is inserted between the opposing sides of the nut and the spring-arm of the pawl, so as to cause the said spring-arm to ride over the face of the stud or stop, and the pawl is then turned outward to the position shown in Fig. 2, and thereby releases the nut from the bolt and permits the nut to be readily turned thereupon.

I am aware that it has been heretofore proposed to provide a nut with a pivoted pawl, and this, broadly, I disclaim. Such devices, so far as I am aware, have been heretofore used in connection with bolts the shanks of which are permanently provided with a series of longitudinal grooves or recesses extending across the threads of the bolt. This construction is disadvantageous, for the reason that it greatly mutilates the threads of the bolt, and adds considerably to the expense of manufacturing the latter. My invention differs from this in that I provide the shank of the bolt with only one notch or recess, which is made after the nut is screwed home on the bolt and at a point coincident with the path of the free end of the pawl. By this means it is only necessary to provide the bolt with a single recess or indentation, and thereby the threads of the bolt are only mutilated to a minimum degree. My method is further advantageous, inasmuch as the recess or indentation may be made at the point coincident with the path of the free end of the pawl when the nut is screwed entirely home, thus leaving no space between the nut and the object against which its inner face bears.

Where the bolt is provided with a series of longitudinal grooves or recesses, the nut must stop at some predetermined point, in order to enable the pawl to engage one of the said recesses, and it may happen that at such a point the nut will not be entirely screwed home.

Having thus described my invention, I claim—

The combination, in a nut-lock, of the nut, a pawl pivoted thereto at one end and having the point $d$ to engage the bolt, the portion of the pawl beyond said point forming a spring-arm, and a stud or pin on the nut having one end beveled, so as to allow said spring-arm to be turned toward the center of the nut, but prevent its movement in the reverse direction, substantially as specified.

In testimony that I claim the foregoing as my own I have hereto affixed my signature in presence of two witnesses.

JOHN LAWRENCE HALL.

Witnesses:
FRANK CRAIG,
O. A. BALYENT.